UNITED STATES PATENT OFFICE.

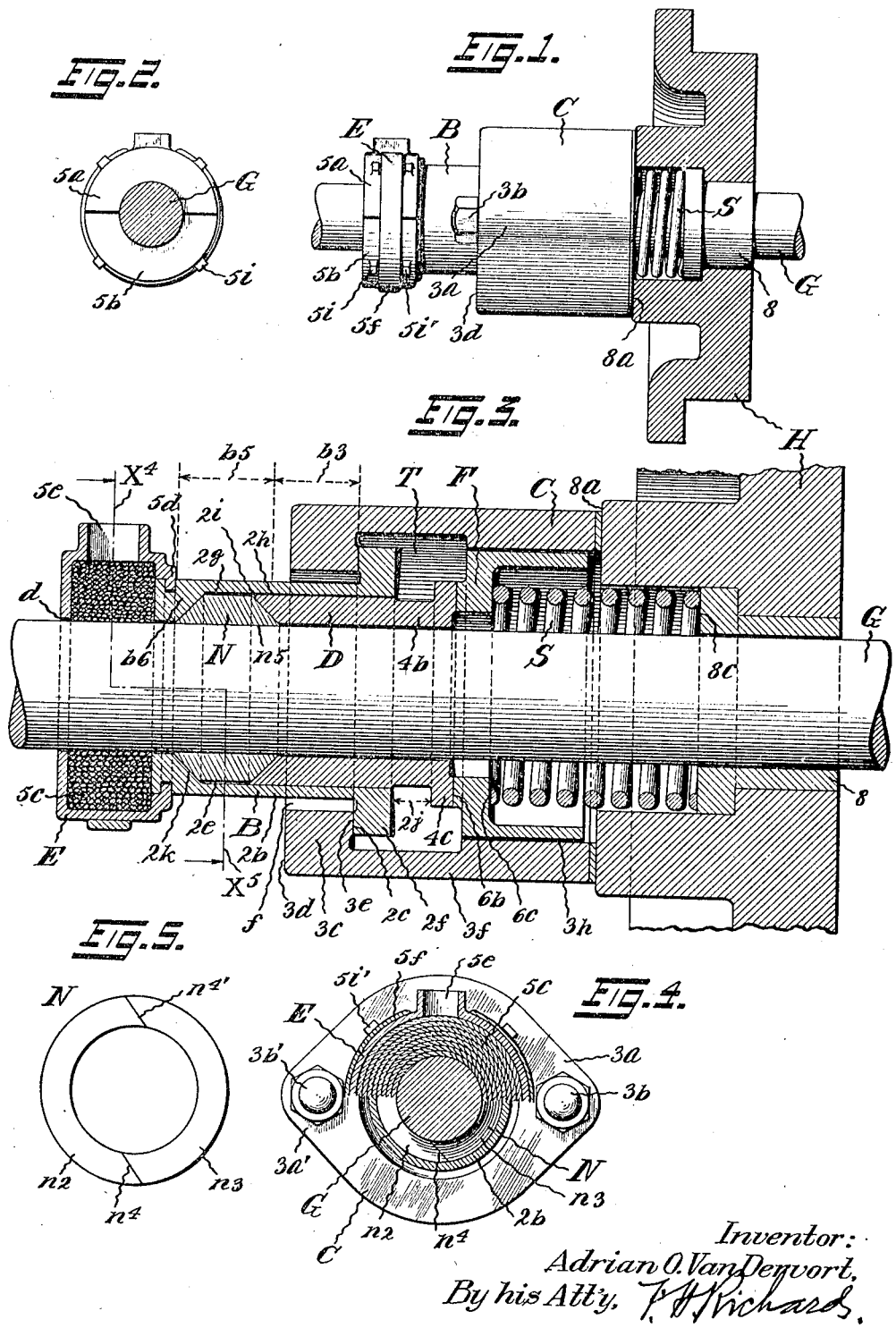

ADRIAN O. VAN DERVORT, OF TROY, NEW YORK.

PACKING-BOX FOR PISTON-RODS.

1,289,974.	Specification of Letters Patent.	Patented Dec. 31, 1918.

Application filed May 12, 1917. Serial No. 168,280.

*To all whom it may concern:*

Be it known that I, ADRIAN O. VAN DERVORT, a citizen of the United States, residing in Troy, in the county of Rensselaer and State of New York, have invented certain new and useful Improvements in Packing-Boxes for Piston-Rods, of which the following is a specification.

This invention relates to packing boxes for use on piston rods which are subjected to high steam pressures and to superheat temperatures. A principal object of the present improvements is to furnish a packing box of said class, which shall be effective and reliable when applied to the piston rods and valve stems of superheater locomotives, and to accomplish those results by the use of packing rings made of a relative soft metal and having favorable anti-friction qualities combined with a minimum tendency to wear the rods.

One object and advantage of the invention, is the provision of a method of packing a piston rod of steel while the rod is subjected to superheated steam, which consists in surrounding the steel rod with a ring of anti-friction metal or analogous material, which melts or normally becomes plastic at a temperature less than or not much above the temperature of the steam,—the pressure of the steam being applied to the packing ring in the direction of the length of the rod,—and radiating heat from the packing ring sufficient to reduce the temperature thereof to a point about midway between ordinary atmospheric temperatures and the melting-point of the metal, and thus to maintain the metal of the ring in an effective condition as a rod packing.

A further object is to provide, for the attainment of the results above indicated, a packing box of extreme simplicity of organization and arrangement,—and mode of action,—as compared with the exacting requirements met with in the operation of steam engines,—and especially on locomotives,—using efficient superheaters.

A feature of importance in my present improvements is the peculiar relationship of the packing metal of the packing ring between the outer surface of the piston rod and the inner surface of a radiation-sleeve, whereby, while the apparatus is in use, a firm contact is normally produced between the said members, so that the heat is rapidly transmitted from the surface of the rod outwardly through the packing metal to the exterior surface of said sleeve, thus providing in a most effective manner for a rapid disposal of the heat by conduction and radiation outwardly. By this means, the metal of the packing ring may be of such a quality that under the direct action of the heat of the superheated steam, said packing ring metal would be plastic (or even become fully melted). Thus under the heating due to transmission of heat into the packing metal combined with the rapid radiation provided for as aforesaid, said packing metal can be maintained in a condition of relative mobility between a rigid condition and the said plastic or melted condition. The result of this peculiar conditioning of the packing ring metal, especially when using the same in superheater locomotives is to permit the employment of a "white metal" having a melting point under the temperature of the superheated steam, (now frequently above 700°), while preventing the melting or the undue plasticity of the metal while the ring is in use.

A further result of the aforesaid features of my present improvement is to provide for using a metal which is found in practice to be most suitable as regards the sliding contact and lubrication of the piston rods and at the same time to provide for a greatly increased life of the packing rings, so that long runs may be made with superheater locomotives drawing heavy loads without such an impairment of the packing as to require repair or a re-adjustment thereof, or the replacing of the packing ring during a long period of service. These results, it is believed, have not hitherto been accomplished in practice on superheater locomotives, or in connection with the use of white metal packing rings. Thus, my present improvements meet conditions newly arisen in the art while retaining the recognized advantages of the white metal rings, and avoiding the use,—as now generally required,—of harder rings (usually involving copper alloys) which are well known to be extremely detrimental to the piston rods. Furthermore, such harder rings, although more resistant to heat, do not in practice produce the required effectiveness of the packing.

To the accomplishment of the above stated objects, and others of a similar nature, my invention consists in the construction, combination, and arrangement of parts set forth in and falling within the scope of the claims forming part hereof. And it should be understood that I do not confine myself to all the details of construction, as there may be modification thereof and variation therein without departing from the spirit of my invention or exceeding the scope of the claims.

In the accompanying drawing forming a part of this specification, Figure 1 is a side view, or elevation, of a packing box made in accordance with my present improvements.

Fig. 2 is an end view, as seen from the left-hand in Fig. 1, of the lubrication device in a preferred form thereof.

Fig. 3 is a longitudinal sectional view, (on a larger scale than Figs. 1 and 2), for more fully exhibiting the preferred form and arrangement of the several members and details.

Fig. 4 is a cross-sectional view on the lines $X^4$ to $X^5$, Fig. 3, as seen from the left hand in Fig. 3, but with some parts not shown.

Fig. 5 is an end view of the packing ring, N, when consisting of two duplicate segments, as $n^2$ and $n^3$, arranged in a preferred manner.

Similar characters designate like parts in all the views.

In the drawing, I have shown the mechanism assembled in connection with a casing or chamber C, of a form or design especially intended for use with piston rods of moderate sizes, as for instance from one to three inches in diameter, and of a form such as may be conveniently employed for packing the valve stems of locomotives. It will however, be understood that when the packing apparatus is applied to piston rods of a larger size, particularly to the piston rods of heavy locomotives of the superheater class, it may be desirable to construct the casing or chamber C for being held in place by four or more bolts, as will be readily understood by those familiar with such locomotives and the various details thereof. In Figs. 1 and 3, the casing C is shown as applied in a well-known manner, against the outer face $8^a$ of the member H, which in practice may represent the head of a steam cylinder, or the end wall of a valve chest. As seen in the end-view, (Fig. 4), the casing C may have suitable enlargements, such for instance as at $3^a$, $3^{a\prime}$, in which holes may be formed for receiving holding bolts of an ordinary kind, as indicated at $3^b$, $3^{b\prime}$, whereby to removably secure the casing to the head or member H. In some instances, if preferred,—and as will be evident,—the casing member C may be constructed to have an integral connection (not herein shown) to and with such a head member, as H.

The mechanism chamber, C, is shown provided with an inwardly-projecting flange, as $3^c$, having an inner face, $3^e$, against which contacts the face $2^c$ of the flange $2^f$ of the sleeve member B. This arrangement, the faces $3^e$ and $2^c$ being in true planes, permits the member B to have a lateral movement for maintaining the proper relation between the sleeve B and piston rod, as G, when this rod springs sidewise, or "vibrates", as commonly occurs in locomotive practice, often to the extent of one-eighth to one-fourth of an inch, or even more. Said joint, at the faces $3^e$, $2^c$, by cutting off at that point the continuity of the metal of the parts C and B, also operates to reduce the conduction of heat, (in the metal of those members), from the member C to the member B, thus aiding in a purpose hereinafter more fully explained. However, the entire outer surface of said casing C will radiate heat, especially the thinner portions thereof, as at $3^i$, (Fig. 3), which I therefore designate as a radiation wall.

It will be observed that the gland ring, or packing compressing ring D, is actuated by steam pressure and the spring S, and that the pressure thus exerted upon the radiation-sleeve B is in addition to the steam pressure directly exerted against said sleeve, so that these two pressures force the flange $2^f$ of said radiation-sleeve against the inner face $3^e$ of the mechanism chamber, thereby bringing a heavy pressure to bear upon said face $3^e$ which is thus readily made steam tight while permitting of the required lateral movement of the operating parts within the mechanism chamber due to the springing laterally of the piston rod. Thus the apparatus comprising the radiation-sleeve B, the packing compressor ring D, packing ring N, together with the lubrication chamber E,—which is herein shown carried on the outer end of said sleeve B,—all move together with the piston rod whenever this rod may move by vibratory action or otherwise in a direction transversely to the line of its axis.

The metal packing ring, N, is shown contained in (and filling) a space within and near the left-hand or outer end of the member B; this member is designated in a general way and as a whole, as the radiation sleeve. This sleeve should in practice be made of strong and preferably of a relatively flexible metal so that it will sustain the high pressures incident to the more recent steam engine practice, while sufficiently yielding as to its cross-sectional form to the slight changes in the circumferential outline of the packing ring, should this ring as a result of wear and compression, or otherwise, become slightly non-circular in its peripheral outline. For meeting these complex conditions, a tough steel of high tensile strength is particularly well adapted, so that in practice the thickness of the metal in the wall 2ᵇ, Fig. 3, may be reduced in many cases to one-eighth of an inch or even less.

The radiation-sleeve is shown extending outwardly from the mechanism chamber C for the purpose of permitting a free access of air to substantially the entire external surface of said sleeve, and a free circulation of air around the principal part of said external surface, so that in practice the principal part, and preferably over the entire length of the packing ring N will be located forward or outwardly (toward the left hand in Figs. 1 and 3), from said mechanism chamber for thereby securing such a rapid radiation of heat outwardly through the wall 2ᵉ of the radiation-sleeve as to constantly maintain the cooling action upon the packing ring itself up to a high degree of efficiency. By means of this arrangement, the radiation effects to which the packing N is subjected in an outward direction balances, or may be said to over-balance, the heating effects due to the transmission of heat to the packing ring from the sliding surface of the piston rod G, and through the gland ring D, as well as that conducted in the metal of said wall 2ᵉ and thus also transmitted from the interior of the casing C. Thus the thinness of the wall 2ᵇ, by reducing the otherwise proportionate heat-conducting capacity of such wall, serves to reduce that conduction capacity relatively to the heat-radiating capacity thereof.

The annular member or gland-ring D is fitted to slide freely but closely within the radiation-sleeve B and is preferably fitted to slide rather loosely over the piston rod as G, and is also preferably of such a length, (lengthwise of the piston rod), as to extend outwardly to a point beyond the outer face 3ᵈ of the mechanism chamber or casing, C, while the inner end, 4ᵇ, thereof is of a length to provide for the wearing away of the packing ring to a greatly reduced length before the inner flange 4ᶜ of said annular member D will move so far outwardly as to come in contact with the retaining flange 2ᶠ of the radiation sleeve. Thus the annular member D may be said to be the packing compressing member of the apparatus. This member during the operation of the engine to which the apparatus is applied and when the engine is subjected to a high pressure, serves in part as a piston sliding within the radiation-sleeve, this piston being forced outwardly and against the ring N by any unbalanced pressure of steam against the inner end thereof. In practice such an unbalanced force of a considerable amount may occur for a brief period, as a result of starting the engine prematurely, or before the parts are properly heated; also, when a new set of packing-ring segments, (Fig. 5), are put in place, and before the ring, as N, becomes fully fitted (by its mobility) into the space to be occupied thereby.

For holding all of the operating parts in proper relation when the engine is running under little or no pressure, or is stopped, the follower sleeve F is provided. This follower preferably has a bearing face, 6ᵇ, bearing against the inner end surface of the flange 4ᶜ of said compressing member D. A spring, as S, of suitable proportions and power is shown arranged to act between the face 6ᶜ of said follower ring and the outer face 8ᶜ of the usual guide or bearing-ring 8. When this guide ring is employed, it is, of course, in effect a part of the cylinder head, H, of the engine, and in some cases it may be omitted and especially when some other suitable face (not shown) shall be provided on the cylinder head as an abutment against which said spring S may bear in a well known manner. Regarding the power of spring S, when the packing box was applied in one instance to a piston rod three and one-half inches in diameter, with the engine using steam of two hundred pounds pressure and a temperature of 700°, the spring was formed to operate properly when made to exert a force of from 200 to 300 pounds.

The anti-friction metal of which the packing ring should in practice usually be composed, is relatively soft and under a moderate degree of heat is relatively mobile as compared with the metal (usually steel) of the radiation sleeve B; also such a packing ring will normally have a much higher degree of expansion by heat than said radiation-sleeve. Also, the metal packing ring by reason of the manner in which it is inclosed while it is in contact with the piston rod, will naturally tend to enlarge and thus along its outer surface,—as at 2ᵍ,—(Fig. 3), come into close contact within the thin wall 2ᵇ. If, while such a condition exists, the said expansion of the packing ring in a diametrical direction, should be so great as to normally more than fill the space between the piston rod G and the interior surface at 2ᵉ of said radiation-sleeve, then the mobility of the metal in the packing ring will normally permit this metal to move more freely in a direction lengthwise of the piston. Thus the cross-sectional area of the packing ring can in no case interfere with the proper operation of the packing box considered as a whole, since any tendency for such an excess expansion diametrically as above indicated, will simply cause the gland sleeve D to move backwardly a slight amount (toward the right hand in Fig. 3), and thereby readjust the apparatus automatically in accordance with the requirements at any particular moment during the operation of the mechanism.

When the packing box, after being heated up to a proper working condition is then allowed to cool off, the packing ring N will of course contract so that in practice a slight space will in many cases then be found to occur as indicated at $2^g$, between the packing ring and the thin wall $2^b$ of the radiation sleeve.

The radiation sleeve B is shown so proportioned and arranged,—and so located in position,—that under some circumstances, especially if the soft metal packing ring should have a greater mobility on one side than on the other of the piston rod, the unequal movement of the packing ring metal or unequal pressures otherwise produced within and outwardly against the thin wall $2^b$ of said sleeve, will readily yield or become slightly non-circular and thereby accommodate the cross-sectional form or outline of the radiation sleeve to conditions which may prevail or be repeated from time to time during a continued operation of the piston rod. A similar accommodation as to circumferential form will naturally ensue when a new pair of the segments, as $n^2$, $n^3$, (Figs. 4, 5), are put in place; the segment-ends, especially when made to abut on the inclined lines, as $n^4$, $n^{4'}$, whereby the segments may slide upon each other in a direction parallel to those lines, and thus tend to produce a non-circular peripheral outline of the ring N, considered as a whole.

The radiation-area or zone $b^3$ is arranged and proportioned for effecting a preliminary radiation of heat, whereby to reduce the amount of heat which otherwise might,—by conduction in the metal of the sleeve,—finally reach the outer surface of the packing ring. For this purpose I make this zone $b^3$ to have an external or surface area about equal to,—usually and preferably greater than,—the combined cross-sectional areas of the sleeve-wall $2^b$ and gland-sleeve D. Thus the quantity of heat normally conducted through or in said members will be reduced before it can reach the ring N.

By reason of the described mobile nature,—and consequent accommodation as to form and fit,—of the packing ring N while in use and with relation to the described contacting surfaces within the zones $b^3$ and $b^5$, the admission of steam (to any material amount) to the spaces within the outer zone $b^5$ is effectually cut off or prevented. In practice, however, the gland D will usually be fitted to slide freely but closely within the sleeve B so that (in some instances) a slight space may exist at and along the joint at $2^h$, between the said two members B and D. The normal effect of this arrangement is to condense any steam entering said space $2^h$ so far as to reach the packing ring N, so that water only will really contact with the packing ring at the point or outer peripheral line $2^i$. Thus the radiation zone $b^3$ may be said to be a means,—in connection with the gland D, for preventing the access of steam to the corner of the ring N, at $2^i$. Thus the two adjacent radiation zones $b^3$ and $b^5$, as will now be evident, are relatively separate in function, yet coact in a direct manner, since the zone $b^3$ tends to restrict the otherwise normal transmission of heat, while the zone $b^5$ tends more to discharge by radiation such heat as may have reached the packing ring zone $b^5$ by conduction through the members contiguous thereto.

On first putting in service a packing ring comprising a roughly formed pair of the segments as $n^2$, $n^3$, the highly heated steam may flow momentarily and to some extent between the sleeve D, and the piston rod, and so will reach the packing ring N. If, at this time, the abutting end-faces of the segments $n^2$, $n^3$ do not fit exactly, there will naturally be some leakage of the steam through any space between said faces, with the result of heating these surfaces nearly to the temperature of the steam. Since the steam may have, in the locomotive cylinder, a superheat of two or three hundred degrees, the said heating of the segment faces may easily and quickly reach the point where the metal,—for the moment,—will (on the surface thereof) reach the stage of incipient plasticity and thus produce a permanent adhesion (by a kind of welding action), thereby closing said out-let space by the joining together of the segments into a continuous ring and thus instantly stopping the leakage. Thus the mode of action is normally such as to perfect the form and fit of the ring N and its component segments, in case these are initially of an imperfect form.

The friction of the piston continually but slowly wears away the metal on the inner surface $n^5$ of the ring, and this gradual loss is re-supplied by the gradual narrowing of the ring whereby the mass of metal therein may be said to be reformed. Under the combined action of the superheat of the steam, (this being limited by the radiation, as described), and the pressure of the sleeve D, the packing ring metal acquires such an amount of mobility that the sectional area of the ring is shortened while the thickness,—in a radial direction,—is increased; the extent of this shortening of the ring will, of course, be limited to the distance $2^j$, Fig. 3. Thus, as by a substantially continuous readjustment, the proper fit of the packing ring is maintained.

In practice the cross-sectional form of the packing ring N, as seen for instance in the sectional view, Fig. 3, is preferably inclined at about the angle of forty-five degrees, and so inclined both on the inner and outer sides or ends thereof. This construction, as will be obvious, will tend to close in the edges at both the outer and the inner ends by means of the wedging action due to the inclined surfaces and thus tend in a preferable manner to hold the packing closely against the piston rod throughout the entire length of the packing ring. In some cases however, the inclination of said bearing lines may be somewhat more or somewhat less than herein shown and also one or both ends of the said packing ring may be formed without the incline,—or without any substantial amount of incline,—especially when the metal of the packing ring under the conditions in which it is employed shall have a sufficient mobility for adapting itself by pressure to a perfect fit between the piston rod and the inner surface of the radiation-sleeve.

The contacting area between the packing ring N and the gland ring D operates of course as a heat conducting surface whereby heat passing along through the metal of the gland ring will be transmitted into the packing ring and thus tend to reduce the stability and correspondingly increase the mobility of the metal of the packing ring. On the opposite end of the packing ring the contacting surfaces at $2^k$ tend in a similar but reverse manner to take heat away from the packing ring and to transmit such heat outwardly through the sleeve wall $2^b$ from which (along the zone $b^5$) a considerable part of said heat will be rapidly disposed of by radiation. Thus, as will now be obvious, the surfaces through which the heat is transmitted away from the packing ring especially when taken in connection with the radiation zone $b^3$ substantially balance or counteract the surfaces through which heat will be directly transmitted into the packing ring, either through the gland member D, or through the piston rod G, or from these two members taken together. Furthermore, this highly effective control of ring-heating and ring-cooling operations, whereby the same are regulated as required, takes place in a chamber filled by the ring, and to which the steam is practically excluded while the packing box is in use.

In the sectional view, Fig. 3, the follower ring F is shown extending at the right hand nearly to the face $8^a$ of the cylinder head, this arrangement being preferable because furnishing a means for limiting the movement of the packing toward the cylinder (when the steam pressure is shut off) by the friction or adhesion of the packing upon the piston rod. Under such conditions when the rod is moving toward the right hand in Fig. 3, the sleeve B and compressing member D normally move together toward the right hand, providing the adhesive action of the packing ring on the piston rod is greater than the expansive force of the spring S; this action however is not regarded as being unfavorable or in any way a detrimental one.

The follower ring F is indicated as being loosely fitted within the mechanism chamber C, so that a narrow space will be formed at $3^h$ through which steam may pass into the annular chamber or compartment T within which the flange portion $2^f$, of the radiation-sleeve B and also the flange portion $4^e$, of the gland member D, are inclosed. Thus the annular chamber T may in practice have a steam pressure corresponding nearly to that within the engine cylinder, while the steam thus inclosed or segregated between operable members within the apparatus will normally be of a much lower or reduced temperature owing to the radiation of heat constantly occurring through the walls of the said mechanism chamber.

The space within the casing C, and between the members H and F, constitutes a combined steam-and-spring compartment; between and intermediate to this compartment of the mechanism chamber and the radiation wall, $2^b$ of the sleeve B, there is located the segregation, or "saturation" compartment T. When the packing box is applied to a valve stem, of course the steam will enter between the ring 8 and piston G,— passing through the small space usually formed there,—so that the steam will be constantly supplied to the compartment T under nearly the same pressure for considerable periods, but subject, also, to cooling by a similarly constant radiation. When, however, the packing box is applied to the engine cylinder, the steam will flow back and forth to and from the casing C, so that the pressure in the compartment T will be more variable, that is, the pressure will vary with the back and forth flow of the steam. In this case, especially on locomotives while running at high speeds, the compartment pressure will still be a substantial proportion of the maximum pressure in the cylinder.

The compartment T, which is thus partitioned off, may usually be a relatively small annular compartment, which for convenience I designate as the "saturation-compartment". This compartment may in some instances comprise the entire space within the casing, but I prefer the reduced space, as T, whereby to form a relatively closed annular compartment for steam which, especially in a superheater engine, will normally become saturated and thus be reduced to a relatively low temperature for thereby protecting the inner end $2^f$ of the radiation-sleeve B, from the direct effects of the superheat temperature. This arrangement also has the advantage of protecting to a considerable extent the access of the superheated steam to the exterior of the inner end (at the right hand in Fig. 3) of the gland-sleeve D. By this means the amount of heat to which said gland-sleeve and said radiation-sleeve are subjected,—and thus the amount of heat which would otherwise be conducted to or against the packing ring N,—will be materially reduced.

The arrangement here described provides in effect for a two-stage reduction of the temperature of the steam in passing from the cylinder (not shown) along the piston rod to the location of the packing ring, so that in practice the radiation to the wall, as $3^f$, of the casing member C, together with the arrangement of the said saturation compartment or space T will operate to so far reduce the temperature within said space, as to prevent the access of any material amount of superheated steam through the thin space, $2^h$, between the two sleeves B and D, to the vicinity of the packing ring N.

By means of the organization and arrangement as herein set forth, the packing ring N, which is wholly inclosed within the packing ring chamber of the radiation sleeve B, may be made of an anti-friction metal, such as, an alloy consisting of eighty-three parts lead, nine parts antimony, and eleven parts tin, which has a melting point somewhat below the temperature of the steam, especially when this temperature, including the superheat is above 500 or 600 degrees (Fahrenheit); these temperatures are now common in locomotive practice, especially in connection with steam pressures between 150 and 300 pounds per square inch. In some cases where the steam pressure is about 250 pounds per square inch the normal temperature of the steam, when at saturation, would be about 400° so that with the addition of 300° superheat, the temperature of the cylinder would be 700°, which, it should be noted, is exceeded at intervals in some instances. By means of the reduction effected in the temperature of the steam as a result of the combined action of heat conduction and heat radiation in the manner already set forth, the packing ring N may be made of metal having a melting point below 600°, and may have a melting point slightly below 500° even when the temperature of the steam in the cylinder reaches to a temperature somewhat above 500°; and under these conditions the packing ring by reason of the described heat conduction and heat radiation is prevented from melting and is readily maintained in an effective condition as a rod-packing for the valve stems and piston rods of engines, and is especially adapted for use in superheater locomotives of the most modern types and for meeting the severe conditions and the high degree of durability required, in such engines when employed for heavy duty and especially for running at high speeds.

In a recent instance where my improvement, constructed substantially in the proportions indicated in the drawing, was applied to a superheater locomotive, the packing ring was found to operate effectively when the temperature of the superheated steam was fully 700 degrees and when the melting point of the metal of said packing ring was slightly under 500 degrees. Under such conditions, and excepting for the organization of the apparatus whereby the radiation properly balances the heating of the ring, it is obvious that the packing ring would quickly melt out and thus temporarily put the locomotive out of service.

The lubrication chamber is formed within a lubricator casing, E, comprising in the present instance two segmental portions $5^a$, $5^b$; the chamber (Fig. 2) is indicated as being filled with cotton waste or similar lubricant—retaining means $5^c$. Said casing is shown provided with a flange $5^d$ engaging in a groove formed in a radiation-sleeve B, this sleeve having a relatively short body portion at $b^6$ between said mass of lubricating material and the packing ring N. Thus the reduced heat due to the large radiation surface provided outside of the packing ring is made protective of the lubricating material within the chamber E, while the material, $5^c$, is brought close up to the packing ring and thus operates to lubricate the surface of the piston rod at a point very closely adjacent to the packing ring. This arrangement is found in practice to be perfectly effective and highly desirable and to furnish an exceptional effectiveness of lubrication with a low consumption of lubricating material notwithstanding the great heat to which the piston rod is necessarily subjected by the use of the superheated steam.

The lubricator casing E is herein shown provided on the upper side thereof with a cup-like entrance, or passage at $5^e$ wherein to supply oil to the interior of said casing. In practice, the two parts, $5^a$, $5^b$, of the casing E may be held together in any convenient manner, as by means of any suitable or well known holding devices, such for instance as bolts, or screws, (not shown), but I prefer to employ a retaining spring which in the form thereof herein illustrated consists of a band $5^f$ engaging between lugs $5^i$, $5^{i'}$, on either side thereof and formed some of them on the part $5^a$ and others of them on the part $5^b$ of the casing. The spring is shown extending nearly around the entire casing and by reason of a suitable tension thereof can readily be made to hold the two parts firmly in place. By grasping the casing and forcibly separating the two said parts thereof,—said spring 5ᶠ readily flexing to permit of such separation,—the casing may be so far separated as to disengage its flange 5ᵃ from the said extension of the sleeve B, and thus permit the lubricator casing to be slid along the piston rod whenever this becomes desirable. In practice, also, the two parts of the casing may be disengaged by first opening the said spring sufficiently far to disengage the same from between the said holding lugs, when the spring may be slipped off from the casing thus releasing the two segmental portions thereof, which may then be removed in an evident manner.

In the described construction and arrangement of the lubricator casing,—which is also sometimes designated as the swabbing cup,—this cup together with the mass of material therein may be said to be carried in a fixed position relatively to and upon the out-board end of a packing inclosing sleeve which "floats" with the piston rod during any lateral movements thereof relatively to the mechanism chamber, so that at all times the position of the mass of lubricating material and the inner surface of the packing ring may throughout the entire circumference thereof, have a fixed relation to each other,— and also to the piston rod,—and thus continuously operate in a perfect manner and without being affected by the said lateral movement of the rod. These rod movements, although generally within comparatively narrow limits, frequently occur, as is well known to locomotive constructors and operators, with great rapidity and force. A further result and advantage of said arrangement is that when steam leaks out between the rod G and the ring N, it passes out at the point $d$, (Fig. 3), and that leakage between the faces 3ᵉ and 2ᶜ flows out at the line $f$; thus by a separation of such leakages the engineer is enabled to know at a glance and with certainty where the leakage is taking place. Such leakages may, of course, take place as the result of long continued wear or as the result of accident.

Having thus described my invention, I claim:

1. In a packing box for use on piston rods which are subjected to high steam pressures and to superheat temperatures, in combination, a casing-member having within a radiation wall thereof a gland chamber provided with an inwardly-facing annular seat; a radiation-sleeve having on the inner end thereof a seat-flange engaging said annular seat of the gland chamber, and also having therein a packing-ring chamber located in a position outside of said casing member; a packing-ring of anti-friction metal inclosed in said packing-ring chamber; a gland sleeve supported in the radiation-sleeve and slidable in an outward direction against the packing-ring; and, means within the gland-chamber partitioning off an annular saturation-compartment within which the seat-flange of the radiation-sleeve is located, whereby to form a relatively closed annular compartment for steam which in a superheater engine will normally be saturated and of relatively low temperature, and thereby protect the inner end of the radiation-sleeve from the direct effects of the superheat temperature.

2. In a packing box for use on piston rods which are subjected to high steam pressures and to superheat temperatures, in combination, a casing-member having within a radiation wall thereof a mechanism chamber provided with an inwardly-facing annular seat; a radiation-sleeve having on the inner end thereof a seat-flange engaging said annular seat of the gland chamber, and also having therein a packing-ring chamber located in a position outside of said casing member; a packing-ring of anti-friction metal inclosed in said packing ring chamber; a gland sleeve supported in the radiation-sleeve and slidable in an outward direction against the packing-ring; and, a follower and spring arranged in the mechanism chamber for actuating the gland sleeve toward the packing ring, said follower being also arranged for partitioning off an annular saturation-compartment within which the seat-flange of the radiation-sleeve is located, whereby to protect the inner end of the radiation-sleeve from the direct effects of the superheat temperature.

3. In a packing box for use on piston rods which are subjected to high steam pressures and to superheat temperatures, in combination, a casing-member having a radiation wall, a gland chamber within said wall; a radiation-sleeve extending outwardly from the gland chamber, and having therein a packing-ring chamber located in a position outside of said casing member and in communication with the gland-chamber; a packing-ring of anti-friction metal inclosed in said packing-ring chamber; and, a gland sleeve supported in the radiation-sleeve and slidable outwardly from the gland-chamber and against the packing-ring, said gland-chamber comprising an inclosed saturation-compartment whereby to reduce the otherwise normal effect upon the inner end of the gland sleeve, of the superheat temperature.

4. In a packing box for use on piston rods which are subjected to high steam pressures and to superheat temperatures, in combination, a casing-member having therein a gland chamber, and having an inwardly extending and inwardly facing seat; a separate member consisting of a radiation-sleeve having a thin and relatively flexible wall extending outwardly from the gland chamber, and having therein a packing-ring chamber located in a position outside of said casing member and in communication with the gland-chamber; and having on the inner end thereof a flange engaging said annular seat of the casing; a packing-ring of anti-friction metal of low melting point inclosed in said packing-ring chamber contiguous to said thin wall thereof; a gland sleeve supported in the radiation-sleeve and slidable outwardly from the gland-chamber and against the packing-ring; and means in the gland-chamber for actuating the gland toward the packing ring.

5. In a packing box for use on the piston rods of steam engines to be actuated by steam which has a pressure between two hundred pounds and three hundred pounds per square inch, and has a temperature including the superheat of above six hundred degrees, in combination, a casing-member having a radiation wall and having a gland chamber within said wall; a radiation-sleeve extending outwardly from the gland chamber, and having therein a packing-ring chamber located in a position outside of said casing member; a gland sleeve slidably supported in the radiation-sleeve and arranged to press outwardly against a packing-ring in said packing-ring chamber; and, a packing-ring inclosed within said packing-ring chamber and consisting of an anti-friction metal having a melting point below six hundred degrees, whereby said packing-ring under the combined action of heat conduction and heat radiation is prevented from melting and is maintained in an effective condition as a rod-packing.

6. In a packing box for use on the piston rods of steam engines to be actuated by steam which has a pressure between one hundred and fifty pounds and three hundred pounds per square inch, and has a temperature including the superheat of above five hundred degrees, in combination, a casing-member having a radiation wall and having a gland chamber within said wall; a radiation-sleeve extending outwardly from the gland chamber, and having therein a packing-ring chamber located in a position outside of said casing member; a gland sleeve slidably supported in the radiation sleeve and arranged to press outwardly against a packing-ring in said packing-ring chamber; and, a packing-ring inclosed within said packing-ring chamber and consisting of an anti-friction metal having a melting point below five hundred degrees, whereby said packing-ring under the combined action of heat conduction and heat radiation is prevented from melting and is maintained in an effective condition as a rod-packing.

7. In a packing box for use on piston rods which are subjected to high steam pressures and to superheat temperatures, in combination, a mechanism casing having within a radiation wall thereof a combined steam-and-spring compartment; a separate sleeve member extending outwardly from the mechanism casing and having therein a packing-ring chamber located in a position outside of said casing member; a packing ring of low-melting anti-friction metal inclosed in said packing-ring chamber; a gland sleeve arranged to press outwardly against said packing-ring; a spring for actuating the gland sleeve; temperature-reducing means comprising a thin radiation wall located exteriorly of the mechanism chamber, and also comprising a steam-segregation compartment located intermediate to said steam-and-spring compartment; and the packing-ring; and, means including a pair of transversely located annular seats in position intermediate to the segregation chamber and the said radiation wall, for permitting lateral movement and also reducing the heat conduction to the packing-ring through said radiation wall.

ADRIAN O. VAN DERVORT.

Witnesses:
HIRAM G. HAMMETT,
HENRY I. SIEGEL.

Copies of this patent may be obtained for five cents each, by addressing the "Commissioner of Patents, Washington, D. C."